(12) United States Patent
Bhagwan et al.

(10) Patent No.: US 7,966,270 B2
(45) Date of Patent: Jun. 21, 2011

(54) SYSTEM AND METHOD FOR ADAPTIVE CONTENT PROCESSING AND CLASSIFICATION IN A HIGH-AVAILABILITY ENVIRONMENT

(75) Inventors: Varun Bhagwan, San Jose, CA (US); Daniel F. Gruhl, San Jose, CA (US); Kevin Haas, San Jose, CA (US); Jeffrey A. Kusnitz, Campbell, CA (US); Daniel N. Meredith, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 11/678,075

(22) Filed: Feb. 23, 2007

(65) Prior Publication Data

US 2008/0208893 A1 Aug. 28, 2008

(51) Int. Cl.
*G06F 15/18* (2006.01)
*G06E 3/00* (2006.01)
(52) U.S. Cl. .................... 706/12; 706/20; 706/55
(58) Field of Classification Search .................. None
See application file for complete search history.

(56) References Cited

U.S. PATENT DOCUMENTS

| 6,633,855 B1 | 10/2003 | Auvenshine |
| 6,917,952 B1 | 7/2005 | Dailey et al. |
| 2006/0143603 A1 | 6/2006 | Kalthoff et al. |

OTHER PUBLICATIONS

Wu et al., Y., "MORF: A Distributed Multimodal Information Filtering System", PCM 2002, pp. 279-286, 2002.*
Gauch et al., S., "ProFusion: Intelligent Fusion from Multiple Distributed Search Engines", Journal of Universal Computer Science, vol. 2, No. 9, pp. 637-649, 1996.*
Andersen, D., "Mayday: Distributed Filtering for Internet Services", USITS '03, pp. 31-42, 2003.*
Pappu et al., A., "SpamWall: Heuristic Filter for Web-Spam", Joint Conference on Web Intelligence and Intelligent Agent Technology, 2006.*
Fink et al., G., "A Metrics-Based Approach to Intrusion Detection System Evaluation for Distributed Real-Time Systems", WPDRTS, Apr. 15-17, 2002.*
Gauch et al., S., "Information Fusion with ProFusion", Proceedings of WebNet '96, Oct. 1996.*

(Continued)

*Primary Examiner* — Donald Sparks
*Assistant Examiner* — Adrian L Kennedy
(74) *Attorney, Agent, or Firm* — Gibb I.P. Law Firm, LLC

(57) ABSTRACT

The embodiments of the invention provide a systems, methods, etc. for adaptive content processing and classification in a high-availability environment. More specifically, a system is provided having a plurality of processing engines and at least one server that classifies data objects on the computer system. The classification includes analyzing the data objects for the presence of a type of content. This can include assigning a score corresponding to the amount of the type of content in each of the data objects. Moreover, the server can remove a data object from the computer system based on the results of the analyzing. The results of the analyzing are stored and the computer system is updated with feedback information. This can include allowing a user to review the results of the analyzing and aggregating reviews of the user into the feedback information.

14 Claims, 4 Drawing Sheets

OTHER PUBLICATIONS

Gerlach, et al., "Fault-Tolerant Parallel Applications with Dynamic Parallel Schedules," Proceedings of the 19th IEEE International Parallel and Distributed Processing Symposium (IPDPS'05), 2005, 8 pages.

Liu, et al., "An Adaptive Data Objects Placement Algorithm for Non-Uniform Capacities," Grid and Cooperative Computing—GCC 2004, Third International Conference Oct. 21-24, 2004, pp. 423-430.

Damiani, et al., "Corrigenda: A Hierarchy-Aware Approach to Faceted Classification of Object-Oriented Components," ACM Transactions on Software Engineering and Methodology, vol. 8, No. 4, Oct. 1999, pp. 425-472.

Woods, W., "Conceptual Indexing: A Better Way to Organize Knowledge," Published by Sun Microsystems Laboratories, 1997, pp. 1-91.

Jain, et al., "Data Clustering: A Review," ACM Computing Surveys, vol. 31, No. 3, Sep. 1999, pp. 264-323.

Damiani, et al., "A Hierarchy-Aware Approach to Faceted Classification of Object-Oriented Components," ACM Transactions on Software Engineering and Methodology, vol. 8, No. 3, Jul. 1999, pp. 215-262.

* cited by examiner

SYSTEM AND METHOD FOR ADAPTIVE CONTENT PROCESSING AND CLASSIFICATION IN A HIGH-AVAILABILITY ENVIRONMENT

BACKGROUND

1. Field of the Invention

The embodiments of the invention provide systems, methods, etc. for adaptive content processing and classification in a high-availability environment.

2. Description of the Related Art

Current solutions to large scale processing of objectionable content (text, image, video, etc.) such as pornography, hate speech, etc., are unable to perform the processing in real-time due to a multitude of factors. For example, such factors include challenges with distribution, load-balancing, result-aggregation, feedback loops, etc. Many solutions do not even incorporate any feedback loops. Moreover, the solutions in this space only employ resource-based factors such as central processing unit (CPU), bandwidth, etc., while content-based factors, such as size, near-dupness, associated-data, etc.) are largely ignored.

SUMMARY

The embodiments of the invention provide a systems, methods, etc. for adaptive content processing and classification in a high-availability environment. More specifically, a system is provided having a plurality of processing engines and at least one server that classifies data objects on the computer system. The classification includes analyzing the data objects for the presence of a type of content. This can include assigning a score corresponding to the amount of the type of content in each of the data objects. Moreover, the server can remove a data object from the computer system based on the results of the analyzing. The results of the analyzing are stored and the computer system is updated with feedback information. This can include allowing a user to review the results of the analyzing and aggregating reviews of the user into the feedback information.

The system also includes a multiplexer that distributes the data objects to the processing engines. The distribution includes generating a weight for each of the data objects based upon an object type, an object size, and/or the score. The multiplexer can also calculate the weight based upon whether there is a near-duplicate data object corresponding to the data object. Next, the data object having the highest weight is assigned to a least-busy processing engine.

Another system is provided, wherein the system is adapted to perform classification and adaptive processing in a real-time high-availability environment. The system includes at least one server that compares each data object of a plurality of data objects to a known content profile to produce a content score for each data object. The server provides the data objects and the content score to a user and obtains feedback from the user regarding the content score. Next, the server updates the known content profile based on the feedback. The server can also perform analytics, annotations, and/or additional scoring of the data objects.

Further, a multiplexer is provided to generate a weight for each of the data objects based upon an object type, an object size, and/or the content score. The multiplexer can generate a higher weight to a data object having a lower content score and a lower weight to a data object having a higher content score. The multiplexer can also generate the weight based upon whether a near-duplicate data object corresponding to the data object exists.

Following this, a data object having the highest weight is assigned to a least-busy processing node of a plurality of processing nodes. The multiplexer can determine the least-busy processing node based upon weights of unprocessed data objects on the processing nodes. The multiplexer can also assign an unprocessed data object from a failed processing node to an alternate processing node. Thus, the multiplexer distributes the data objects so as to maintain balanced workloads amongst processing nodes.

The embodiments of the invention further provide a method that includes classifying data objects on a computer system having a plurality of processing engines. The classifying includes analyzing the data objects for presence of a type of content. This involves assigning a score corresponding to the amount of the type of content in each of the data objects. A data object can be removed from the computer system based on the results of the analyzing. The results of the analyzing are stored and the computer system is updated with feedback information. Specifically, at least one user is allowed to review the results of the analyzing, and reviews of the user are aggregated into the feedback information.

The method also includes distributing the data objects to the processing engines. Specifically, a weight is generated for each of the data objects based upon an object type, an object size, and/or the score. Moreover, the weight can be calculated based upon whether there is a near-duplicate data object corresponding to the data object. The data object having a highest weight is then assigned to the least-busy processing engine.

Another method is provided for classification and adaptive processing in a real-time high-availability environment. The method begins by comparing each data object of a plurality of data objects to a known content profile to produce a content score for each data object. Moreover, analytics, annotations, and/or additional scoring of the data objects can be performed. Following this, the data objects and the content score are provided to a user. Feedback from the user regarding the content score is obtained; and, the known content profile is updated based on the feedback.

Next, a weight is generated for each of the data objects based upon an object type, an object size, and/or the content score. A higher weight can be generated for a data object comprising a lower content score; and, a lower weight can be generated for a data object comprising a higher content score. Moreover, the weight can be generated based upon whether a near-duplicate data object corresponding to the data object exists.

Furthermore, a least-busy processing node is determined based upon weights of unprocessed data objects on the processing nodes. The data object having the highest weight is subsequently assigned to the least-busy processing node of a plurality of processing nodes. Additionally, an unprocessed data object can be assigned from a failed processing node to an alternate processing node. Thus, the data objects are distributed so as to maintain balanced workloads amongst processing nodes.

Accordingly, the embodiments of the invention provide automatic and adaptive classification of content in a real-time high-availability environment. This includes a mechanism for analyzing content while ensuring feedback to a learning content-classification engine. A dataflow model is provided that automatically updates the processing engines with feedback information. This allows each engine to update its classification model (adaptive learning) in order to achieve higher precision. Additionally, the embodiments herein provide fault-tolerance of content analytics in a high-availability environment. One or more dispatchers use the current workload of each processing engine to distribute incoming work via the criteria above. Engine failures are handled seamlessly, and any unprocessed content objects are automatically routed to alternate engines.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
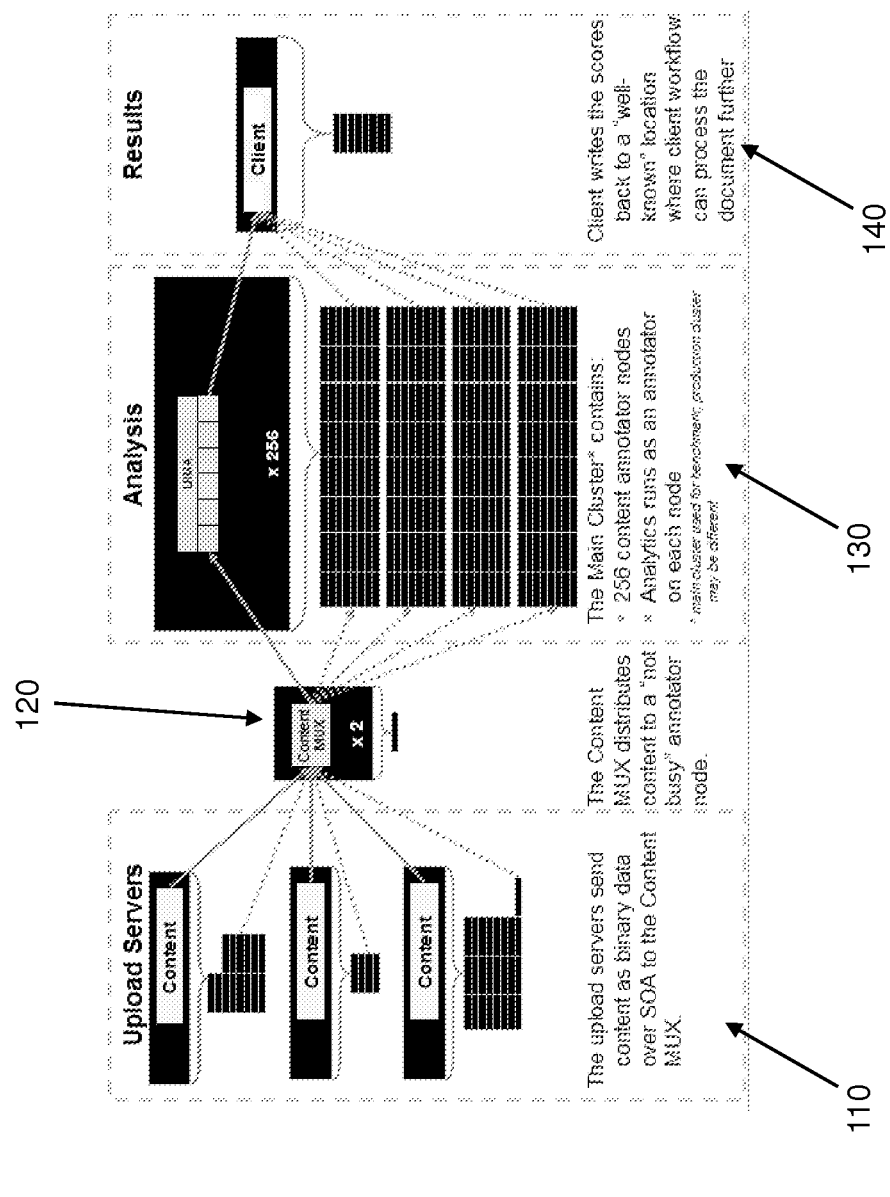
FIG. 1 is a diagram illustrating a system for adaptive content processing and classification in a high-availability environment.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments of the invention provide automatic and adaptive classification of content in a real-time high-availability environment. This includes a mechanism for analyzing content while ensuring feedback to a learning content-classification engine. A dataflow model is provided that automatically updates the processing engines with feedback information. This allows each engine to update its classification model (adaptive learning) in order to achieve higher precision. Additionally, the embodiments herein provide fault-tolerance of content analytics in a high-availability environment. One or more dispatchers use the current workload of each processing engine to distribute incoming work via the criteria above. Engine failures are handled seamlessly, and any unprocessed content objects are automatically routed to alternate engines.

Furthermore, the embodiments of the invention drastically reduce the time required for adaptive processing and classification of content within a high-availability distributed environment. Intelligent distribution of incoming content is provided in order to maintain a balanced load across the worker/processing engines. Moreover, the classification quality is continually enhanced through an automated feedback loop for adaptive content processing. Thus, the feedback loop and the processing environment dramatically augments manual review capabilities via the processing environment and the feedback loop. The embodiments herein minimizes the amount of time that un-reviewed content is available on a commercial high-performance website.

Referring now to FIG. 1, the architecture of a system 100 for adaptive content processing and classification in a high-availability environment is illustrated. The system 100 comprises upload servers 110, at least one content multiplexer (MUX) 120, main cluster 130, and result gathering component 140. More specifically, the upload servers 110 are the nodes that read stored content, or stream incoming content, and pass the content as binary data over service oriented architecture (SOA) to the content MUX 120. Each such data-packet (also referred to herein as "data object") is also annotated with information such as filename, size, type, hash, etc.

The content MUX 120 takes incoming binary data from the upload servers 110 and assigns a normalized weight for each data-packet. The content MUX 120 then determines the least busy node based on weights of outstanding work across the cluster-nodes in the main cluster 130, and assigns the work to that node. Many of the details of servers, multiplexers, workload distribution, etc., are well-known and are not discussed herein in detail so as to focus the reader on the salient portions of the invention. Instead, reference is made to U.S. Patent Publication 20040139433 to Blythe et al. for the description of such details and the same are fully incorporated herein by reference. If a data-packet fails on a given node for any reason, it is sent to the next least busy node in the cluster. This facilitates handling of engine failures in a seamless manner.

The main cluster 130 is the cluster of nodes where the processing and classification analytics are performed. The individual engines are run as annotators on these nodes, and generate annotations based on various factors. For instance, in the web-based image-classification scenario, these annotations could be content-classification, semantic analysis of page-links, profile-scores, etc. The main cluster 130 could contain 256 content annotator nodes.

All results from this analysis are aggregated into the result gathering component 140 such that the client workflow can continue with further processing and tagging of the data-packet, as well as any feedback to the analysis engines. In other words, the client writes the scores back to a "well-known" location where client workflow can process the document further.

Figure 2:
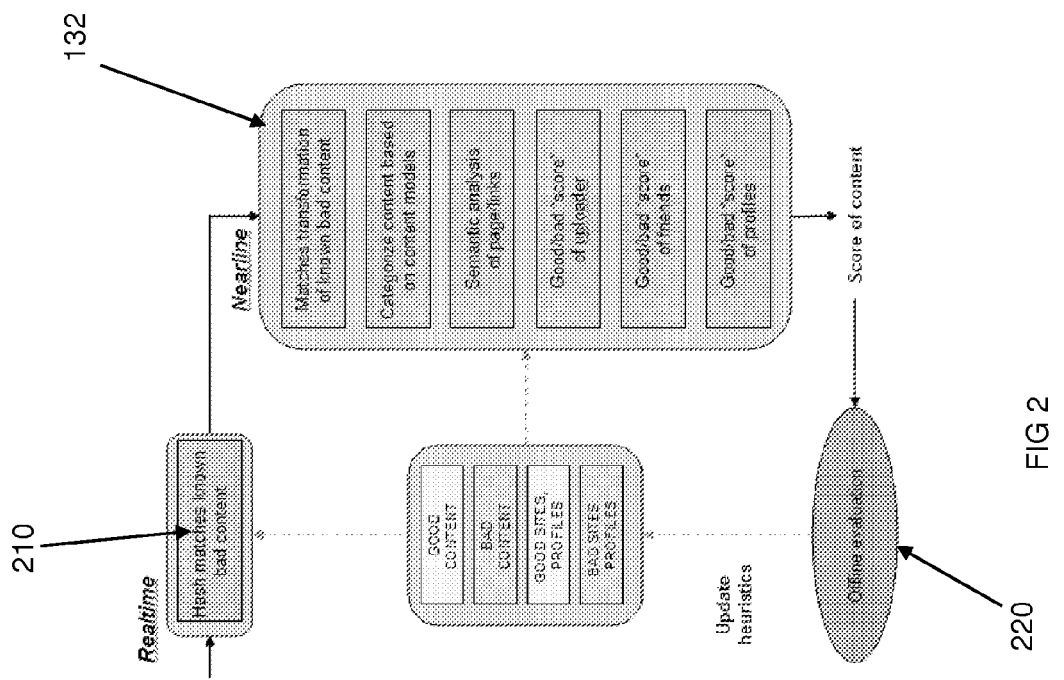
FIG. 2 is a flow diagram illustrating the processing of a single work-packet.

FIG. 2 denotes the actual processing of a single work-packet. Incoming content is first matched against known bad content, and annotated accordingly in component 210. Then, the content is passed through an annotator 132 of the main cluster 130, wherein the annotator 132 performs analytics and assigns scores or annotations. For instance, the annotator 132 can match transformation of known bad content, categorize content based on content models, and/or perform a semantic analysis of pages/links. Further, the annotator 132 can score an uploader, friends, and/or profiles as good or bad. While the figure shows only a few such annotations, other scoring/ annotations can be seamlessly plugged into the analytics engine. Next, the output result gets passed for manual evaluation by evaluator 220. Then the verified score is passed back through the feedback loop into the annotator 132, so that it can update its analytics in an adaptive manner. Many of the details of content filters, feedback loops, etc., are well-known and are not discussed herein in detail so as to focus the reader on the salient portions of the invention. Instead, reference is made to U.S. Patent Publications 20040177110 to Rounthwaite et al. and 20030058216 to Lacroix et al. for the description of such details and the same are fully incorporated herein by reference.

Accordingly, the embodiments of the invention provide a systems, methods, etc. for adaptive content processing and classification in a high-availability environment. More specifically, a system is provided having a plurality of processing engines and at least one server that classifies data objects on the computer system. As described above, the upload servers are the nodes that read stored content, or stream incoming content, and pass the content as binary data over service oriented architecture to the content MUX. The classification includes analyzing the data objects for the presence of a type of content. For example, objectionable content (text, image, video, etc.) can include pornography, hate speech, etc. The analyzing can include assigning a score corresponding to the amount of the type of content in each of the data objects. Moreover, the server can remove a data object from the computer system based on the results of the analyzing.

The results of the analyzing are stored and the computer system is updated with feedback information. This can include allowing a user to review the results of the analyzing and aggregating reviews of the user into the feedback information. As described above, this allows each engine to update its classification model (adaptive learning) in order to achieve higher precision.

The system also includes a multiplexer (also referred to herein as "MUX") that distributes the data objects to the processing engines. The distribution includes generating a weight for each of the data objects based upon an object type, an object size, and/or the score. The multiplexer can also calculate the weight based upon whether there is a near-duplicate data object corresponding to the data object. Next, the data object having the highest weight is assigned to a least-busy processing engine. As described above, the individual engines are run as annotators on nodes, wherein annotations are generated based on various factors. For instance, in the web-based image-classification scenario, these annotations could be content-classification, semantic analysis of page-links, profile-scores, etc.

Another system is provided, wherein the system is adapted to perform classification and adaptive processing in a real-time high-availability environment. The system includes at least one server that compares each data object of a plurality of data objects to a known content profile to produce a content score for each data object. The server provides the data objects and the content score to a user and obtains feedback from the user regarding the content score. Next, the server updates the known content profile based on the feedback. As described above, the classification quality is continually enhanced through the automated feedback loop for adaptive content processing. The server can also perform analytics, annotations, and/or additional scoring of the data objects.

Further, a multiplexer is provided to generate a weight for each of the data objects based upon an object type, an object size, and/or the content score. The multiplexer can generate a higher weight to a data object having a lower content score and a lower weight to a data object having a higher content score. The multiplexer can also generate the weight based upon whether a near-duplicate data object corresponding to the data object exists.

Following this, a data object having the highest weight is assigned to a least-busy processing node of a plurality of processing nodes. As described above, the individual engines are run as annotators on nodes, wherein annotations are generated based on various factors. The multiplexer can determine the least-busy processing node based upon weights of unprocessed data objects on the processing nodes. The multiplexer can also assign an unprocessed data object from a failed processing node to an alternate processing node. As described above, this facilitates handling of engine failures in a seamless manner. Thus, the multiplexer distributes the data objects so as to maintain balanced workloads amongst processing nodes.

The embodiments of the invention further provide a method that includes classifying data objects on a computer system having a plurality of processing engines. The classifying includes analyzing the data objects for presence of a type of content. For example, objectionable content (text, image, video, etc.) can include pornography, hate speech, etc. This involves assigning a score corresponding to the amount of the type of content in each of the data objects. A data object can be removed from the computer system based on the results of the analyzing. The results of the analyzing are stored and the computer system is updated with feedback information. Specifically, at least one user is allowed to review the results of the analyzing, and reviews of the user are aggregated into the feedback information. As described above, this allows each engine to update its classification model (adaptive learning) in order to achieve higher precision.

The method also includes distributing the data objects to the processing engines. Specifically, a weight is generated for each of the data objects based upon an object type, an object size, and/or the score. Moreover, the weight can be calculated based upon whether there is a near-duplicate data object corresponding to the data object. The data object having a highest weight is then assigned to the least-busy processing engine. As described above, the individual engines are run as annotators on nodes, wherein annotations are generated based on various factors. For instance, in the web-based image-classification scenario, these annotations could be content-classification, semantic analysis of page-links, profile-scores, etc.

Another method is provided for classification and adaptive processing in a real-time high-availability environment. The method begins by comparing each data object of a plurality of data objects to a known content profile to produce a content score for each data object. Moreover, analytics, annotations, and/or additional scoring of the data objects can be performed. Following this, the data objects and the content score are provided to a user. Feedback from the user regarding the content score is obtained; and, the known content profile is updated based on the feedback. As described above, the classification quality is continually enhanced through the automated feedback loop for adaptive content processing.

Next, a weight is generated for each of the data objects based upon an object type, an object size, and/or the content score. A higher weight can be generated for a data object comprising a lower content score; and, a lower weight can be generated for a data object comprising a higher content score. Moreover, the weight can be generated based upon whether a near-duplicate data object corresponding to the data object exists.

Furthermore, the least-busy processing node is determined based upon weights of unprocessed data objects on the processing nodes. The data object having the highest weight is subsequently assigned to the least-busy processing node of a plurality of processing nodes. As described above, the individual engines are run as annotators on nodes, wherein annotations are generated based on various factors. Additionally, an unprocessed data object can be assigned from a failed processing node to an alternate processing node. As described above, this facilitates handling of engine failures in a seamless manner. Thus, the data objects are distributed so as to maintain balanced workloads amongst processing nodes.

Figure 3:
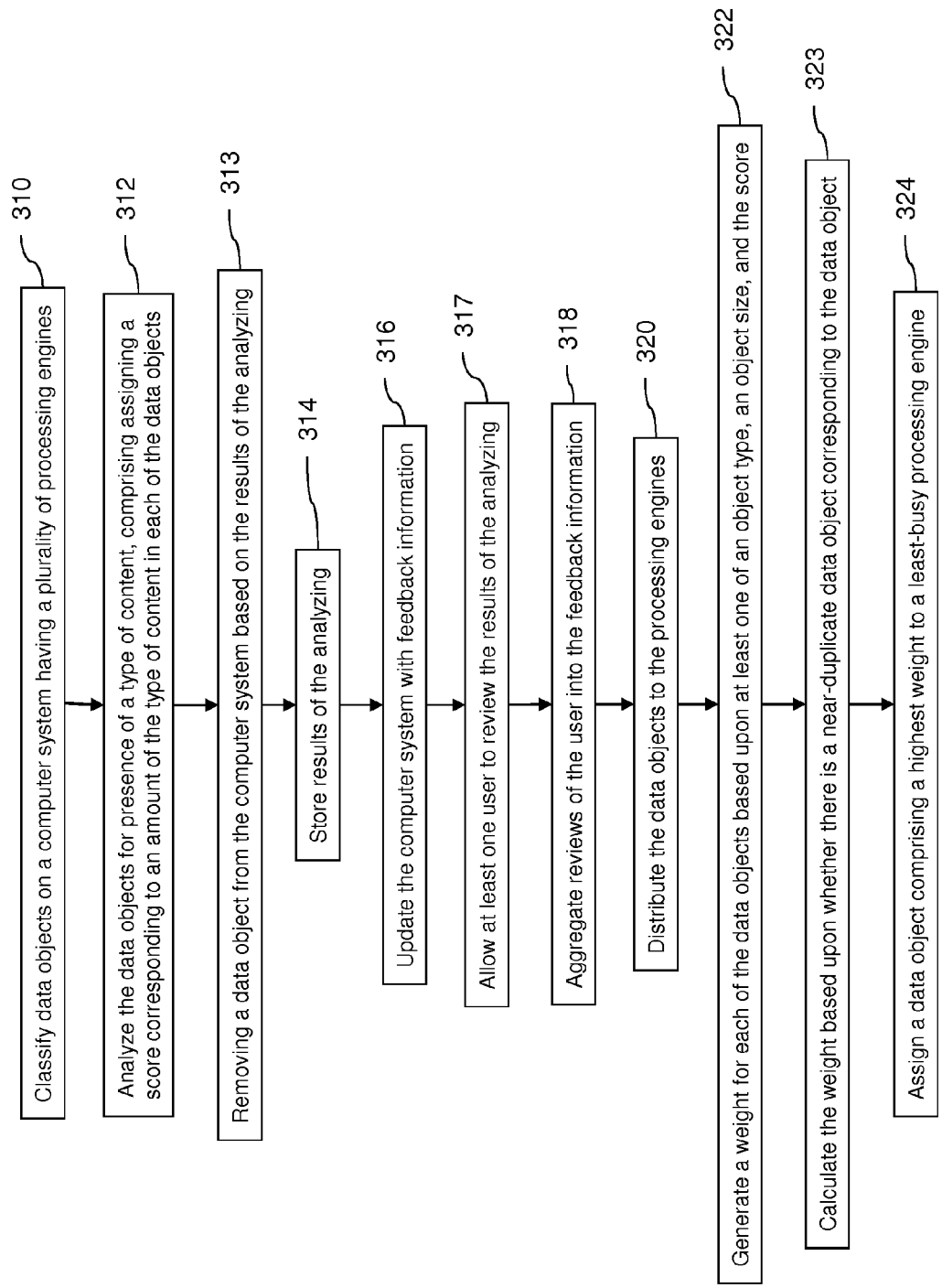
FIG. 3 is a flow diagram illustrating a method for adaptive content processing and classification in a high-availability environment.

FIG. 3 is a flow diagram illustrating a method for adaptive content processing and classification in a high-availability environment. The method begins in item 310 by classifying data objects on a computer system having a plurality of processing engines. This includes, in item 312, analyzing the data objects for the presence of a type of content, comprising assigning a score corresponding to an amount of the type of content in each of the data objects. For example, objectionable content (text, image, video, etc.) can include pornography, hate speech, etc. In item 313, a data object can be removed from the computer system based on the results of the analyzing. Next, results of the analyzing are stored (item 314) and the computer system is updated with feedback information (item 316). The updating includes allowing at least one user to review the results of the analyzing (item 317) and aggregating reviews of the user into the feedback information (item 318). As described above, this allows each engine to update its classification model (adaptive learning) in order to achieve higher precision.

Following this, in item 320, the data objects are distributed to the processing engines. More specifically, in item 322, a weight is generated for each of the data objects based upon an object type, an object size, and/or the score. This can include, in item 323, calculating the weight based upon whether there is a near-duplicate data object corresponding to the data object. Finally, in item 324, the data object having the highest weight is assigned to the least-busy processing engine. As described above, the individual engines are run as annotators on nodes, wherein annotations are generated based on various factors. For instance, in the web-based image-classification scenario, these annotations could be content-classification, semantic analysis of page-links, profile-scores, etc.

Figure 4:
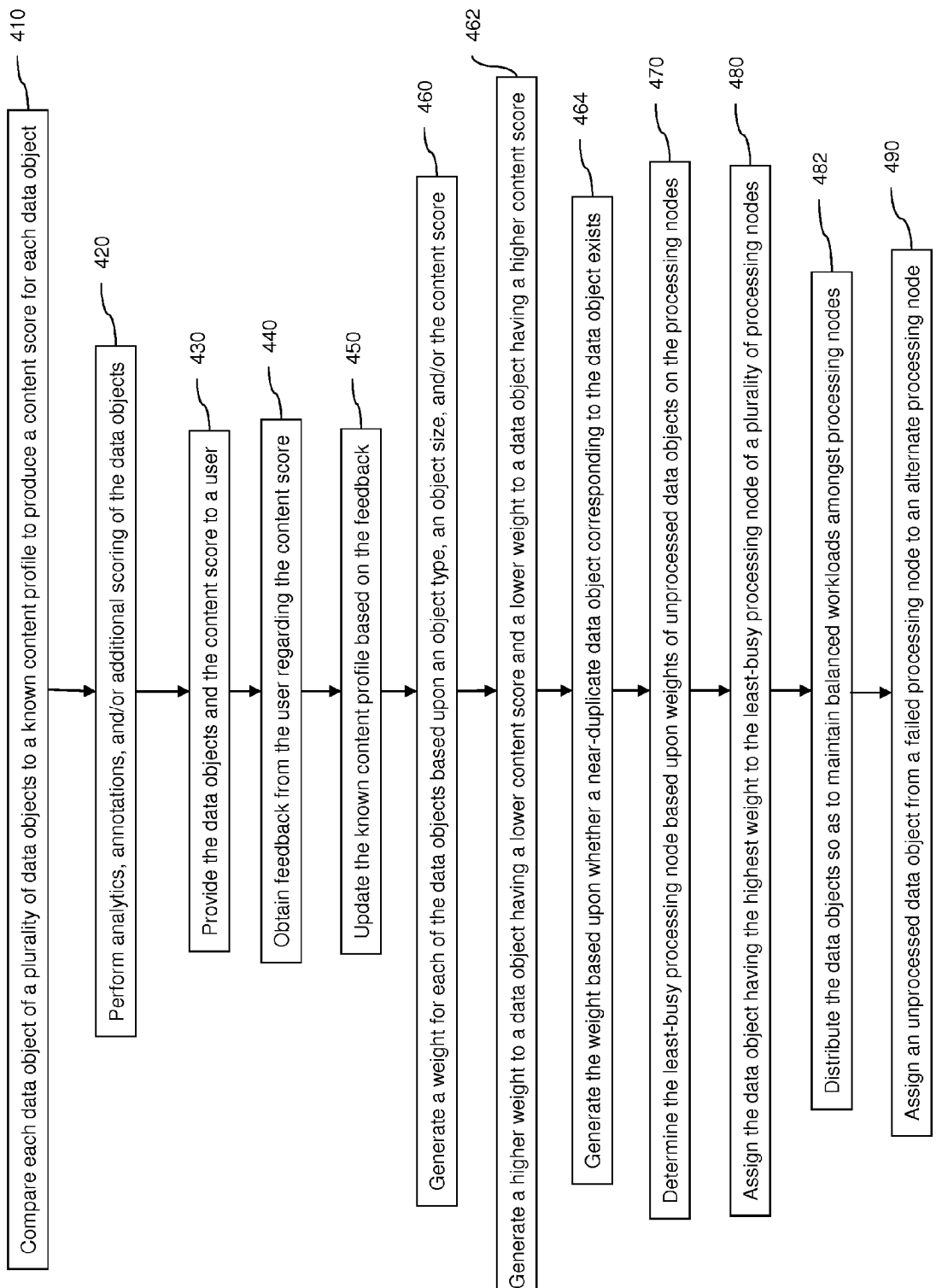
FIG. 4 is a flow diagram illustrating another method for adaptive content processing and classification in a high-availability environment.

FIG. 4 is a flow diagram illustrating another method for adaptive content processing and classification in a high-availability environment. The method begins in item 410 by comparing each data object of a plurality of data objects to a known content profile to produce a content score for each data object. In item 420, analytics, annotations, and/or additional scoring of the data objects is performed. Next, in item 430, the data objects and the content score are provided to a user. Feedback from the user is obtained regarding the content score (item 440) and the known content profile is updated based on the feedback (item 450). As described above, the classification quality is continually enhanced through the automated feedback loop for adaptive content processing.

Following this, in item 460, a weight is generated for each of the data objects based upon an object type, an object size, and/or the content score. This includes, in item 462, generating a higher weight to a data object having a lower content score and a lower weight to a data object having a higher content score. Moreover, in item 464, the weight is generated based upon whether a near-duplicate data object corresponding to the data object exists.

Subsequently, in item 470, the least-busy processing node is determined based upon weights of unprocessed data objects on the processing nodes. In item 480, the data object having the highest weight is assigned to the least-busy processing node of a plurality of processing nodes. As described above, the individual engines are run as annotators on nodes, wherein annotations are generated based on various factors. Thus, in item 482, the data objects are distributed so as to maintain balanced workloads amongst processing nodes. Additionally, in item 490, an unprocessed data object can be assigned from a failed processing node to an alternate processing node. As described above, this facilitates handling of engine failures in a seamless manner.

The existing art has been unable to deal real-time with objectionable material (pornography, hate speech, etc.) (e.g., U.S. Pat. No. 7,046,258 to Naito, et al.). Current approaches use estimation processes which are done independent of the content and are not based on a content-based adaptive learning model (e.g., U.S. Pat. No. 7,062,768 to Kubo, et al.). The existing art does not take into account heterogeneous computing facilities or workloads of varying, random sizes and intervals (e.g., U.S. Pat. Nos. 7,058,641 and 7,039,784 to Franz, et al. and Chen, et al., respectively). Business transactions and content factors are not considered when existing systems distribute the work packets. These systems only use computational elements such as CPU or bandwidth (e.g., U.S. Pat. Nos. 7,039,784 and 7,039,655 to Chen, et al. and Kapczynski, et al., respectively). The existing art does not provide content classification and processing in a high-availability computing infrastructure.

Conventional systems do not take into account heterogeneous computing facilities or workloads of varying, random sizes and intervals. Further, use estimation processes are conventionally done independently of the content and are not based on an adaptive learning model. Business transactions and content factors are not considered when conventional systems distribute the work packets. Conventional systems only use computational elements such as CPU or bandwidth. Additionally, the existing art does not focus on content classification and processing in a high-availability computing infrastructure, as the invention does.

Accordingly, the embodiments of the invention provide automatic and adaptive classification of content in a real-time high-availability environment. This includes a mechanism for analyzing content while ensuring feedback to a learning content-classification engine. A dataflow model is provided that automatically updates the processing engines with feedback information. This allows each engine to update its classification model (adaptive learning) in order to achieve higher precision. Additionally, the embodiments herein provide fault-tolerance of content analytics in a high-availability environment. One or more dispatchers use the current workload of each processing engine to distribute incoming work via the criteria above. Engine failures are handled seamlessly, and any unprocessed content objects are automatically routed to alternate engines.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method comprising:
comparing, by a computing device, each data object of a plurality of data objects to a known content profile to produce a content score for each said data object;
providing, by said computing device, said data objects and said content score to a user;
obtaining feedback from said user regarding said content score;
updating, by said computing device, said known content profile based on said feedback;
generating, by said computing device, a weight for each of said data objects based upon at least one of an object type, an object size, and said content score; and
assigning, by said computing device, the data object comprising a highest weight to a least-busy processing node of a plurality of processing nodes.

2. The method according to claim 1, wherein said generating of said weight comprises generating a higher weight to a data object comprising a lower content score and generating a lower weight to a data object comprising a higher content score.

3. The method according to claim 1, wherein said generating of said weight comprises generating said weight based upon whether a near-duplicate data object corresponding to said data object exists.

4. The method according to claim 1, further comprising, prior to said providing of said data objects and said content score to said user, performing, by said computing device, at least one of analytics, annotations, and additional scoring of said data objects.

5. The method according to claim 1, further comprising, prior to said assigning of said data object, determining, by said computing device, said least-busy processing node based upon weights of unprocessed data objects on said processing nodes.

6. The method according to claim 1, further comprising assigning, by said computing device, an unprocessed data object from a failed processing node to an alternate processing node.

7. The method according to claim 1, wherein said assigning of said data objects comprises distributing said data objects so as to maintain balanced workloads amongst processing nodes.

8. A system comprising:
at least one server adapted to
compare each data object of a plurality of data objects to a known content profile to produce a content score for each said data object,
provide said data objects and said content score to a user,
obtain feedback from said user regarding said content score,
update said known content profile based on said feedback; and
a multiplexer adapted to
generate a weight for each of said data objects based upon at least one of an object type, an object size, and said content score, and
assign the data object comprising a highest weight to a least-busy processing node of a plurality of processing nodes.

9. The system according to claim 8, wherein said multiplexer is adapted to generate a higher weight to a data object comprising a lower content score and generate a lower weight to a data object comprising a higher content score.

10. The system according to claim 8, wherein said multiplexer is adapted to generate said weight based upon whether a near-duplicate data object corresponding to said data object exists.

11. The system according to claim 8, wherein said server is adapted to perform at least one of analytics, annotations, and additional scoring of said data objects.

12. The system according to claim 8, wherein said multiplexer is adapted to determine said least-busy processing node based upon weights of unprocessed data objects on said processing nodes.

13. The system according to claim 8, wherein said multiplexer is adapted to assign an unprocessed data object from a failed processing node to an alternate processing node.

14. The system according to claim 8, wherein said multiplexer is adapted to distribute said data objects so as to maintain balanced workloads amongst processing nodes.

* * * * *